United States Patent

[11] 3,573,726

[72] Inventors Leroy D. Towell;
Harry K. Scott, Dallas, Tex.
[21] Appl. No. 762,725
[22] Filed Sept. 26, 1968
[45] Patented Apr. 6, 1971
[73] Assignee Computer Industries, Inc.
Los Angeles, Calif.

[54] PARTIAL MODIFICATION AND CHECK SUM ACCUMULATION FOR ERROR DETECTION IN DATA SYSTEMS
20 Claims, 5 Drawing Figs.

[52] U.S. Cl. ........ 340/146.1
[51] Int. Cl. ........ G08c 25/00, H041 1/10
[50] Field of Search ........ 340/146.1; 235/153

[56] References Cited
UNITED STATES PATENTS

| | | | |
|---|---|---|---|
| 3,411,135 | 11/1968 | Watts | 340/146.1 |
| 3,466,601 | 9/1969 | Tong | 340/146.1 |
| 3,471,830 | 10/1969 | McRae et al. | 340/146.1 |

*Primary Examiner*—Malcolm A. Morrison
*Assistant Examiner*—Charles E. Atkinson
*Attorney*—Jackson and Jones

ABSTRACT: This invention relates, in general, to error detection for blocks of binary data, and more particularly relates to the transmission of a uniquely modified and check sum accumulated error identifying word, together with detection circuitry at the receiver location which senses the unique word and thereby verifies or negates that a block of data was correctly transmitted and received.

In one preferred embodiment of the invention disclosed herein, a method and apparatus is disclosed for generating at a transmitting station, an error-checking word. The error-checking word is generated by making, in response to random binary bit sequences, unique modifications in its content. For example, one such unique modification in the word's content is made in response to the number of frames in the block of data to be transmitted. Another unique modification of the error word's content is made each time a check sum on a bit-by-bit basis exceeds the modulus, i.e. total bit-plus-bit capacity available in the error word. The error word's content is subject to yet another unique modification, in response to the occurrence of a multibit word, within an overall block of data words, containing all ZERO's.

In one particular embodiment the complement of this error word is generated and sent to the receiver as the final word after a data block has been transmitted. Another essentially identical error-check summing circuit at the receiver station accumulates another error word. The receiver error-check word, when summed with the complemented error-check word from the transmitter has a predictable total when all data in the block has been transmitted and received error-free. If a sum other than that predicted is obtained at the receiver, then the received data contained an error.

INVENTORS
LEROY D. TOWELL
HARRY K. SCOTT
BY Jackson + Jones
ATTORNEYS.

PARTIAL MODIFICATION AND CHECK SUM ACCUMULATION FOR ERROR DETECTION IN DATA SYSTEMS

BACKGROUND OF THE INVENTION

1. Field of the Invention

The field of this invention includes, in general, computers, data transmitters and receivers and, specifically, has application as an interface between data sources and data utilization circuitry. It is particularly applicable in conjunction with data communication links over which large blocks of data at high bit rates must be transmitted and received error-free with a high actual data transmission rate.

2. Description of the Prior Art

Error checking schemes for blocks of digital data information are well known. Such schemes of the prior art include longitudinal, lateral, or longitudinal-lateral parity checks normally based upon a 6-bit word, with a predetermined number of words constituting a block of data. Normally, a seventh additional bit in each word is also used for lateral EVEN or ODD parity. The disadvantages of this prior art scheme are apparent in that less than six-sevenths of the data bits transmitted actually carry useable data; or, stated in another way, slightly more than one-seventh of the normal data transmission capability of the system is utilized for error checking rather than for useful data transmission. Today's motivation is to provide high-speed data transmission with acceptable transmission error rates at maximum useable data capacity. Generally speaking, a lateral, longitudinal, and/or lateral-longitudinal parity scheme of the prior art, is not an acceptable solution for such motivation.

Another prior art scheme employed, requires a check sum accumulation wherein the number of occurrences of one specified binary bit (normally a ONES bit) is totaled from word-to-word. Such totaling is normally in the narrowest dimension of the block of binary data. Thus, the bits of a first word are summed to the bits of a second word, in order to arrive at a first sum. This first sum is added to the bits of a next word, so as to obtain a second sum. The second sum is added to the next word to obtain another sum, and so on throughout the entire block of binary data. In such a technique, the designer must compromise the accuracy and the data capacity of the system in order for the total sum to exhibit meaningful error-checking characteristics. Normally, this total sum in a check sum scheme includes many more bit positions than the number of bit positions allotted to one word. For example, such a check sum scheme may require an error-checking signal having four or five times as many bit positions as that allotted to any one word. Furthermore, in such a check sum scheme of the prior art there is no available verification for all ZERO words, nor is there any verification available for the total number of frames or words which make up an entire data block.

Even if an all ZERO counter, and a frame counter were suggested for such a system, the amount of hardware is significantly increased without verification of the position of all ZERO words, even though the useable data capacity is reduced by such additional operations. For these reasons, the check sum scheme of the prior art, and the longitudinal and lateral parity schemes of the prior art have not satisfied today's motivation toward acceptable error rates with maximum useable data capacity for transmission and reception purposes.

SUMMARY OF THE INVENTION

The foregoing disadvantages of the prior art are avoided in accordance with the techniques of this invention wherein high-speed data with acceptable transmission error rates at a near maximum useable data capacity may be handled in data blocks which utilizes a partial sum modification of a limited-bit error-check word together with a check sum accumulation for the error-check word. This invention, as a nonlimiting example, utilizes two 6-bit characters as a word, or frame, with a predetermined number of words and/or frames constituting each block of binary data to be transmitted and received. Unique frame marks are positioned at the beginning and end of the data block to aid in identifying each distinct data block. These unique frame marks are also made up of two 6-bit characters per frame. The frame marks and the data words are monitored by a partial sum modifier and a check sum accumulator circuit. The partial sum modification accounts for all ZERO frames regardless of the total number and the occurrence locations within the data block. Upon the recognition of an all ZERO word or frame, the bit sequence stored in a check sum accumulator circuit is modified in a predetermined manner. This recognition and consequent predetermined modification serves to verify, at the receiver, that each all ZERO frame was intentionally transmitted and is not the result of a communications link malfunction.

The partial sum modification circuit also compensates for the limited modulus of the check sum accumulator. For example, the check sum accumulator may have as few bit positions as there are bit locations in one frame. This compensation is obtained by the technique of adding a predetermined number into the check sum accumulator each time its modulus is exceeded. In accordance with this invention, this predetermined number is added once for each time the accumulation of a frame causes the modulus of the check sum accumulator to be exceeded. Otherwise stated, whenever a frame and an error-check word, present in the check sum accumulator, produce a carry bit when summed to update the error-check word, then the predetermined number is further added to the updated error-check word.

The partial sum modifier further modifies the error-check word by modifying it for each frame of the data block transmitted. Accordingly, an error-check word at the conclusion of a block of binary data has a unique bit sequence dependent upon the random nature of the data transmitted. Stated in another way, the bit sequence of an error-check word of this invention is encoded by a partial sum modifier and check sum accumulator circuit, in such a manner that both dimensions of a block of data are verified. An added advantage of this invention is that a limited number of bit positions are occupied by the error-check word, which error-check word is derived by relatively simple, and yet, highly reliable methods and apparatus of this invention.

At the transmitter station the error-check word present in the check sum accumulator is complemented and is transmitted to the receiver station immediately at the conclusion of the data block (including, of course, the frame marks). The same method and apparatus of this invention is employed at the receiving station. When the entire data block has been received, an error-check word will have been generated and be available at the receiver. A simple summation of the complemented error-check word from the transmitter with the error-check word derived at the receiver station readily indicates whether or not the block of data was transmitted and received error free.

An additional advantage of this invention is that in those instances wherein one or more errors have been detected through the error-check word of this invention, the method steps described herein allows a simple comparison of a printed-out version of the transmitted and received data blocks to be made to discover the bit sequences which introduced errors in the overall system.

DESCRIPTION OF THE PREFERRED EMBODIMENTS

Figure 1:
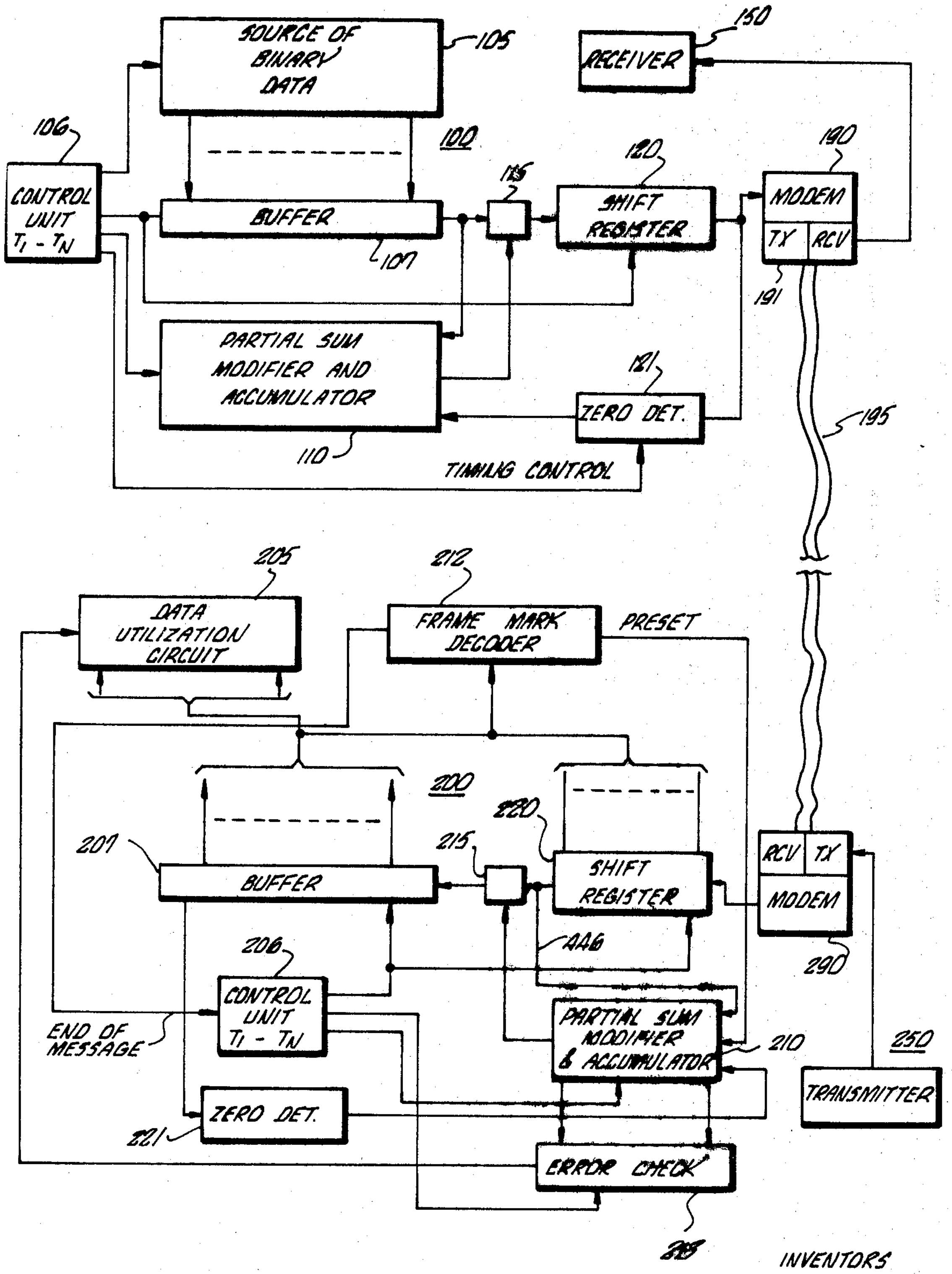
FIG. 1 depicts, in accordance with the principles of this invention, a block diagram of an error-check circuit at a transmitter and at a receiver station, both of which are adapted for modem communication.

Turning now to FIG. 1, a transmitter station 100 is shown connected through a transmitting modem 190 via a pair of lines 195 to a receive modem 290 located at a receiver station 200.

At the transmitter station 100, a source of binary data 105 is shown, which binary data source may be a computer, or radar, or telemetry, or other data source which has available binary data that is to be grouped in blocks of data for transmission to some other location. The principles of this invention are applicable to transmission from circuit location to circuit location within one station such as a computer station. Thus, it should be understood, the principles of this invention are not limited to transmission of blocks of data from one transmitting station via a communication link to another receiver station. Nor is the invention limited to dual direction transmission as depicted in FIG. 1 where a receiver 150 is adapted for communication with another transmitter station 250. In this regard, it should be understood that receiver station 150 is a mirror image of receiver station 200 (shown in detail); whereas, transmitter 250 is a mirror image of transmitter station 100. Communication principles for dual transmitter-receiver operation are well known, as is the manner of selectively controlling transmission between a given transmitter and its receiver. Accordingly, only communication between stations 100 and 200 will be described in detail.

A control unit 106 at the transmitter station 100 provides the overall timing sequences for the transmitter station. The control unit 106 may be any well-known timing control source which provides timing pulses in a manner which is described in more detail hereinafter. Timing control source 106 initiates a data transmission operation by reading out in parallel from source 105, a first frame mark No. 2 (F.M. 2).

Figure 2:
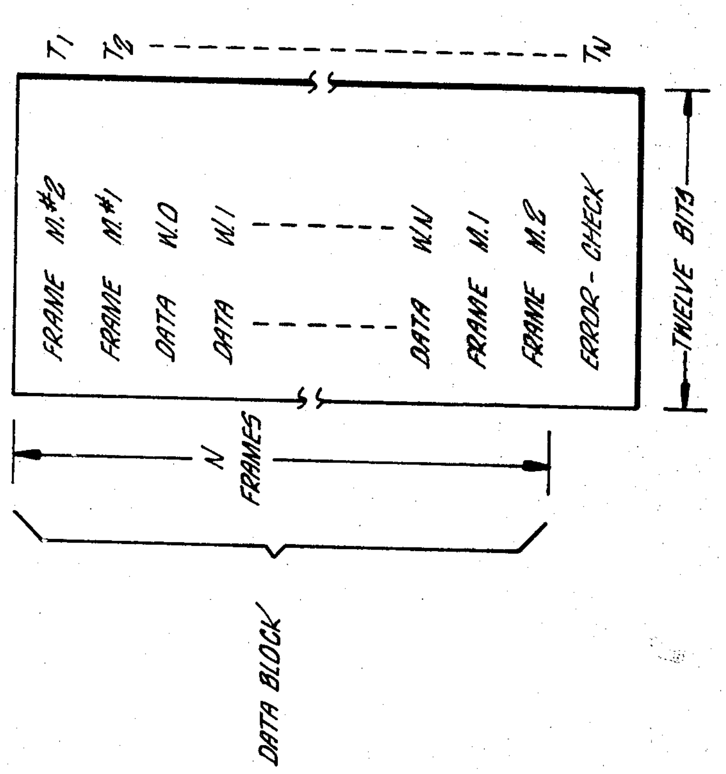
FIG. 2 depicts a symbolic arrangement of frame marks and data frames together with the error-check word in one nonlimiting data format in accordance with the principles of this invention.

Frame mark No. 2 may consist, in accordance with one embodiment of this invention, of two characters of six bits per character. As the invention is described, it will become readily apparent that the number of bits per character, the number of characters per words, the number of words per frame and the number of frames per data block discussed herein, are representative only and are not to be taken as limiting. Reference is made to FIG. 2, to illustrate one typical data format. As shown in FIG. 2, each parallel frame at times $t_1$, $t_2$, through $t_n$, consists of 12 binary bits per frame. In the example of FIG. 2 two frame pairs are reserved for unique frame marks signifying the beginning and the end of a binary data block. After the last frame mark which signifies the end of a data block, one frame is reserved for an error-check word. This error-check word is emitted by the partial sum modifier and accumulator circuit 110 shown in FIG. 1 at transmitting station 100, in a manner to be described hereinafter.

Under control of timing source 106, an entire data block such as that of FIG. 2, is shifted frame-by-frame in parallel from source 105 to buffer 107. Frame after frame is serially shifted from buffer 107 through logic circuitry 115 into shift register 120.

During the transfer of this data block, circuit 110 monitors each bit outputed from buffer 107 and performs a partial sum modifying and a check sum accumulating operation thereon. In addition a ZERO detector 121 is associated with circuit 110 in order to also perform additional modification to the contents of circuit 110. Thus, detector circuit 121, under timing control from unit 106, checks each frame of information in a data block. Circuit 121 determines if any given 12-bit frame includes all ZEROS. In the event an all ZERO frame is detected by circuit 121, a signal is applied thereby to circuitry 110.

The partial modifier and check sum circuit 110 is also outputed through logic circuitry 115 to shift register 120 only at the end of each data block. This output takes place during the error-check frame which is immediately subsequent to the frame mark pair indicating the end of a data block. At the transmitter station 100 all of the foregoing frame marks, data frames, and the error-check frame are transmitted by a transmitter 191 at a modem 190. At the receiver station 200, a receiver modem 290 receives the foregoing frame marks, data frames and the error-check frame of the data block of FIG. 2.

Under timing control from control unit 206 the frame marks, identified in FIG. 2 as frame marks No. 2 and No. 1, are stored in that order in buffer 207 and in shift register 220, respectively. A frame mark decoder 212 monitors the bit sequences stored in buffer 207 and in shift register 220. The frame marks No. 2 and No. 1 are unique in that they are eliminated from any possible data frame combinations. Decoder 212, upon detection of both frame marks in proper time sequence, emits a preset command to circuit 210. The preset command from decoder 212 stores a preset bit sequence, or count, in the partial sum modifier and accumulator circuit 210. Thereafter, the data frames are received at shift register 220 and are gated through the logic circuitry 215 into buffer 207. The operation continues until a block of received data is stored in a data utilization circuit 205. Data utilization circuit 205 may be any well-known utilization circuit capable of storing an entire data block in a memory of any known type.

The final frame received in shift register 220 after a data block has been recovered is the complemented error-check word generated at the transmitter. This complemented error-check word is summed from shift register 220 into the accumulator circuit 210. An error check circuit 213, under the control of timing control circuit 206, monitors the bit sequences of the summed signal obtained by accumulator circuit 210 and serves to recognize a predetermined bit pattern indicating that the data block has been received error free. If the entire data block has been received error free, the error check circuit 213 emits an output signal to utilization circuit 205, indicating that the data has been received properly. Utilization circuit 205 may then read out that data block from memory for its own utilization, or for utilization by any other associated circuitry.

Prior to further discussion of the receiver operation, the operation of the partial sum modifier and accumulator circuit 110 at transmitting station 100 will be described with reference to FIG. 3 and certain Tables hereinafter set out. In particular, the partial sum modification and the accumulation, in accordance with the principles of this invention, is performed by simple circuitry connected in a new and unique combination. The modification and check sum, however, may be performed by other circuitry through the utilization of method steps which are also described hereinafter in connection with FIG. 3 and certain Tables.

Figure 3:
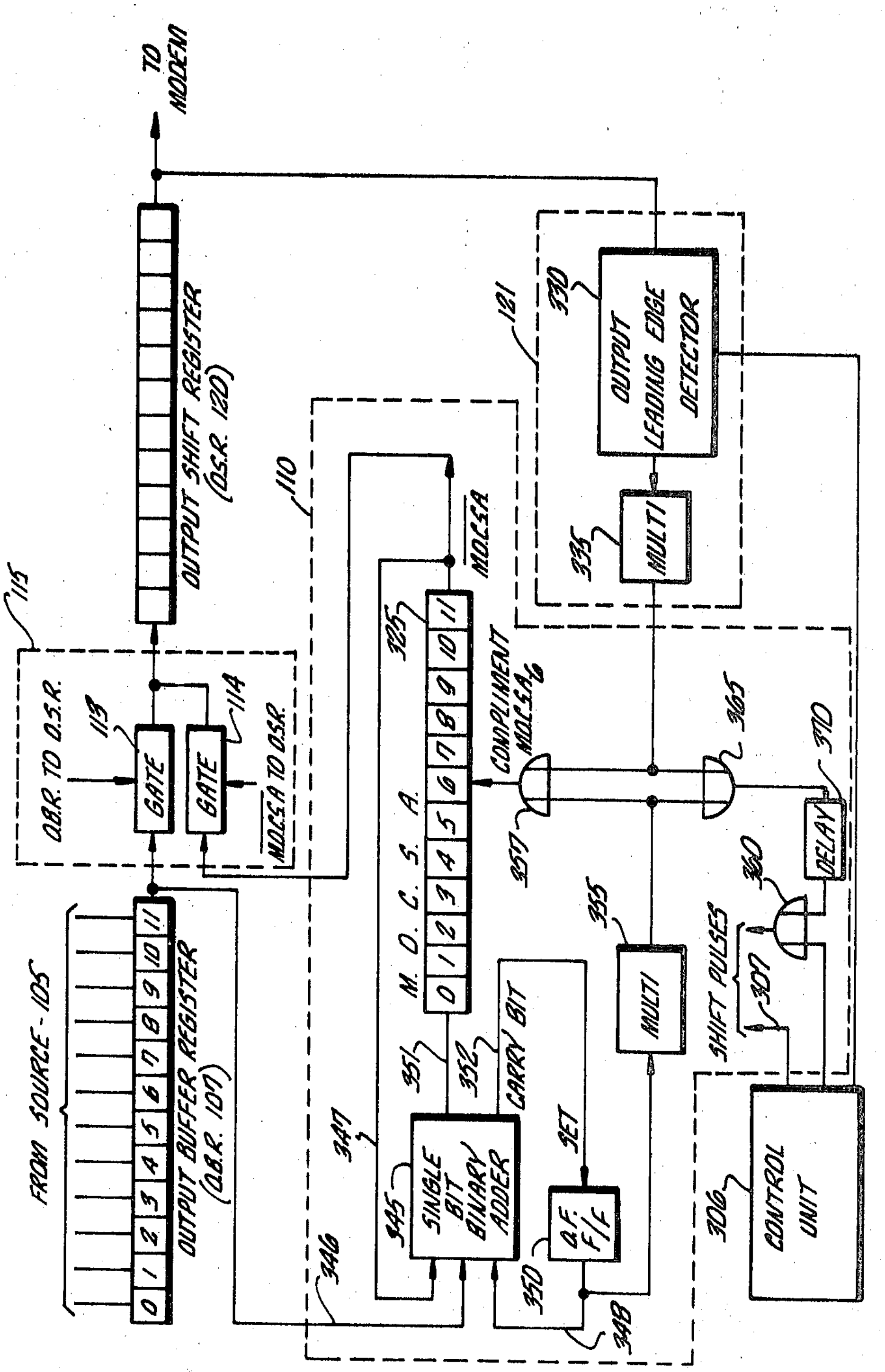
FIG. 3 depicts, in accordance with the principles of this invention, a combined block diagram and circuit schematic of the partial sum modifier and check sum accumulator circuitry of FIG. 1.

Turning now to FIG. 3, a more detailed circuit schematic of the partial sum modifier and accumulator circuit 110 of FIG. 1 is depicted. Certain components in FIG. 3 have been repeated from FIG. 1 and such components are similarly designated. Thus, buffer 107 of FIG. 1 is repeated in FIG. 3 and is shown as an output buffer register (hereinafter referred to as O.B.R. 107) of any well-known type. O.B.R. 107 has 12 stages with one stage each associated with bit positions 0 through 11 as indicated in the 12 stages of O.B.R. 107.

Logic circuitry 115 includes a pair of transmission gates 113 and 114. Transmission gate 113 is enabled under timing control of unit 106. Gate 113 serves to serially transmit, at predetermined time intervals, the contents from O.B.R. 107 to output shift register 120 (hereinafter referred to as O.S.R. 120). O.S.R. 120 is also any typical 12 stage series-shifted register which has its output adapted to apply input digital level data signals to a transmitter such as modem 190 of FIG. 1. In a similar manner, the modified output check sum accumulator circuit 325 (hereinafter referred to as M.O.C.S.A. 325) may also be a series shift register having 12 serially connected shift stages for storing bits 0 through 11, as indicated in the stages thereof. One given shift stage of M.O.C.S.A. 325 is adapted to be complemented during particular time intervals, as described hereinafter. It is to be understood that any of the shift stages may be complemented as will become evident from the following discussion.

In order to appreciate one typical embodiment for the application of this invention, it is presumed that a bit transfer rate of 4800 bits per second (B.P.S.) is required by modem 190. At 4800 B.P.S. a full sampling cycle by the modem transmitter equals 208 microseconds per cycle. This full cycle is divided into two equal increments of 104 microseconds each. An arbitrary designation for data sampling by modem 190 is presumed to require a LOW pulse condition as shown in the pulse train 305 in FIG. 5. A HIGH pulse condition for pulse train 305, FIG. 5, is the interval in which the transmitting station readies the next 12 -bit frame for presentation to modem 190.

Figure 5:
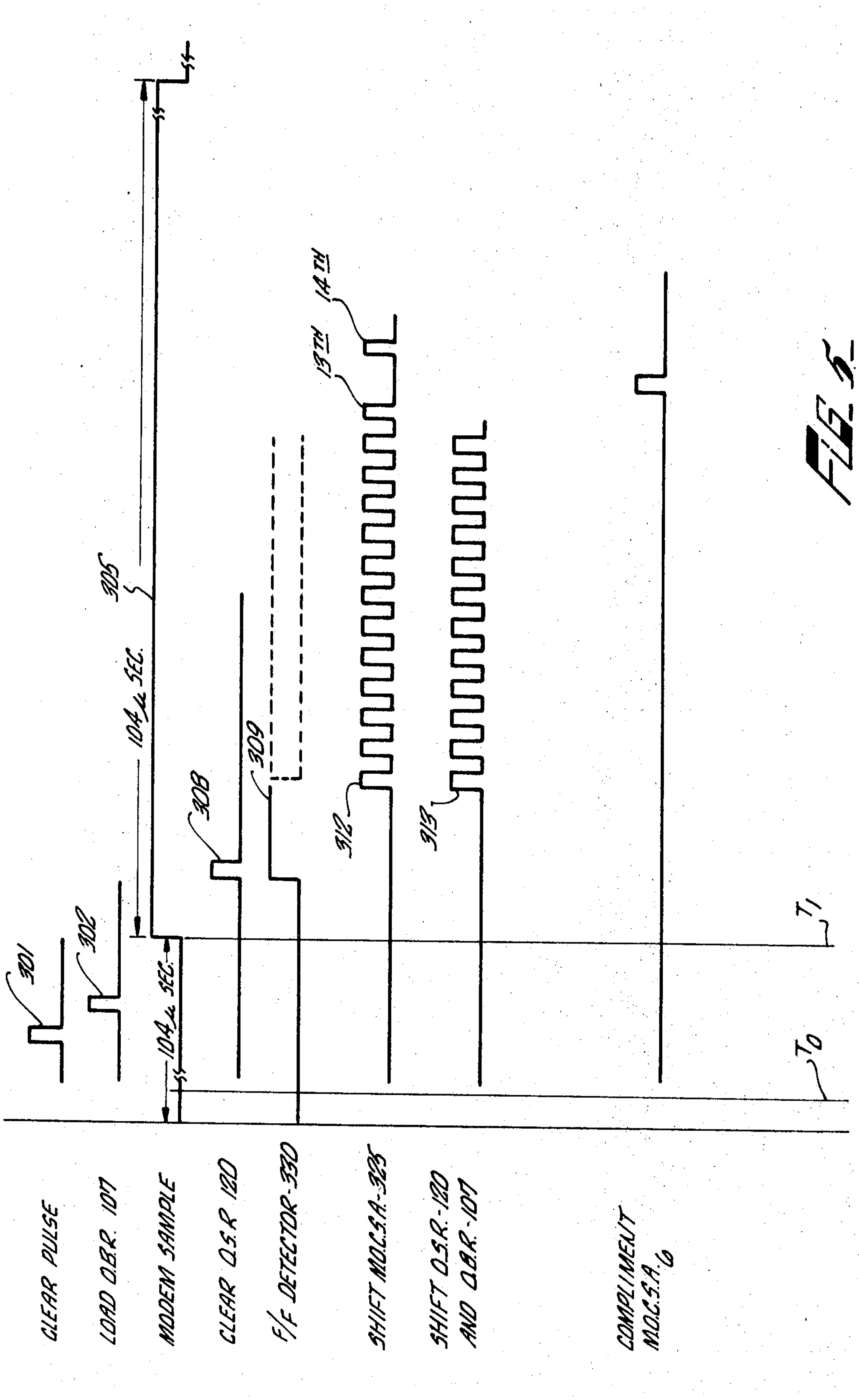
FIG. 5 depicts pulse waveforms useful in promoting a better understanding of the principles of this invention.

As shown in FIG. 5, timing control 106 emits a CLEAR pulse 301 prior to any transmission of a new block of data. CLEAR pulse 301 is applied to the O.B.R. 107, O.S.R. 120 and the modified output check sum accumulator circuit 325. Pulse 301 clears all stages of these registers. Control unit 106 thereafter emits a first output pulse 302 which loads, from source 105, the first frame into O.B.R. 107, FIG. 3. At time $t_1$, FIG. 5, a HIGH level exists in pulse wave form 305. As mentioned above, data must be obtained for modem transmitter 190 prior to pulse form 305 going LOW. An additional CLEAR pulse 308 clears O.S.R. 120 and sets a leading edge detector circuit 330, FIG. 3. This detector 330 may be a bit detector flip-flop which remains set if a full frame is gated out of O.S.R. 120 without the bit sequence containing any ONES bit. If, however, a frame contains one or more ONES bits, the leading edge detector circuit 330 is reset. Thus, the state of leading edge detector 330, as shown by wave train 309, may be either HIGH or LOW, depending upon whether or not a given frame includes all ZEROS. Wave trains 312 and 313, FIG. 5, are also emitted from control unit 106. These trains 312 and 313 are synchronized for the first 12 clock pulses thereof, and synchronously shift respectively M.O.C.S.A. 325, O.B.R. 107 and O.S.R. 120 during the 12 bit periods associated with each frame. Pulse train 312 for M.O.C.S.A. 325 may also include thirteen or fourteen shift pulses depending upon particular partial sum modifications defined in detail hereinafter.

Connected to the input of M.O.C.S.A. 325 is a single bit binary adder circuit 345 of any type well known in the prior art. Adder circuit 345 has three distinct inputs. One input for adder 345 is obtained via lead 346 from the output stages of O.B.R. 107. Another input for adder circuit 345 is obtained from lead 347 which feeds the output of M.O.C.S.A. 325 back to adder circuit 345. A third input for adder circuit 345 is applied via lead 348 which applies a signal from an overflow flip-flop 350. Overflow flip-flop 350 normally maintains a reset state until it is set by a carry bit output from adder circuit 345.

Figure 4:
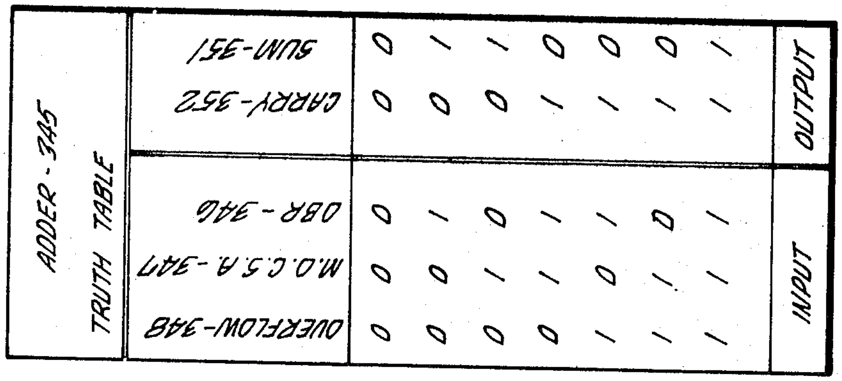
FIG. 4 is a TRUTH TABLE for the single bit binary adder circuit of FIG. 3.

Each of the foregoing input signals to binary adder circuit 345 may be either a ZERO or a ONE. The ZERO or ONE input possibilities for adder circuit 345 are shown in the Truth Table of FIG. 4. The first column in the Truth Table of FIG. 4 indicates a ZERO or ONE condition on overflow lead 348. The second input column indicates the ZERO or ONE possibilities for feedback lead 347 from M.O.C.S.A. 325 and the third input column of the Truth Table indicates the ONE and ZERO possibilities of the output stage from O.B.R. 107. Adder circuit 345 has two output leads 351 and 352, FIG. 3. Output lead 351 is the sum lead for delivering an input signal to the first stage of M.O.C.S.A. 325. The ONE and ZERO possibilities for sum lead 351 are shown in the second output column of the Truth Table of FIG. 4. Output lead 352 delivers, in some instances to be described, a carry bit output which sets overflow flip-flop 350. The ONE and ZERO signal possibilities for carry-bit lead 352 are shown in the first output column of the Truth Table of FIG. 4.

When overflow flip-flop 350 is set, a ONE condition is applied to the input of adder circuitry 345 via lead 348. An output from overflow flip-flop 350 also triggers a multivibrator 355 which complements the sixth bit (M.O.C.S.A.$_6$) of the contents of circuit 325 by a pulse delivered through an OR gate 357. OR gate 357 also pulses the sixth bit (M.O.C.S.A.$_6$) in response to multivibrator 335 which is triggered by an output from leading edge detector 330. Any other bit may be complemented instead of the sixth bit.

An OR gate 365 has its inputs connected in common to those of OR gate 357, and conducts pulses at the same time as described for gate 357. A delay circuit 370 allows M.O.C.S.A.$_6$ to be complemented and thereafter through OR gate 360, M.O.C.S.A. is shifted an additional time. The shifting operation and the operation of binary adder 345 will now be described with reference to Tables 1 through 3.

Table 1 sets forth a sequence or method steps useful in understanding the operation of the partial sum modifier and accumulator circuit of this invention.

Tables 2 and 3 discloses certain data bit sequences and the manner in which they are modified in accordance with this invention.

TABLE NO. 1

CHECK SUM ACCUMULATOR SEQUENCE

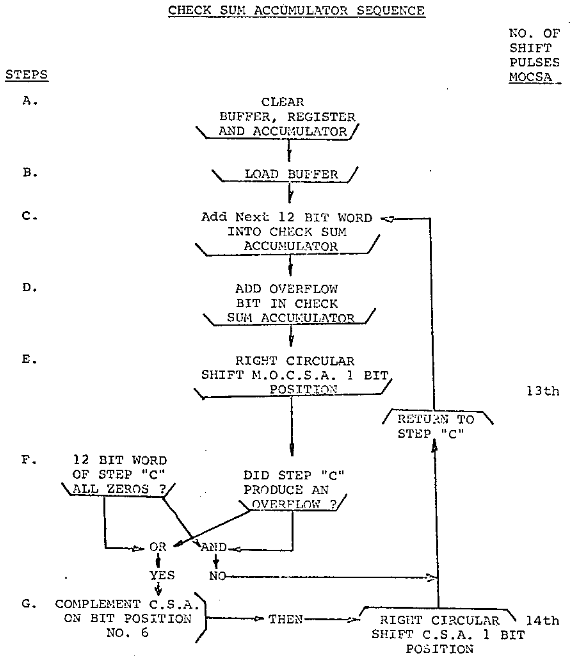

TABLE NO. 2

DATA EXAMPLE OF M.O.C.S.A. SEQUENCE

| | SHIFT PULSES | MOCSA INPUT | OVERFLOW FLIP-FLOP | DATA BITS |
|---|---|---|---|---|
| | | CLEAR | 0 | 000 000 000 000 |
| TRANSMIT FIRST FRAME (F.M.2) | 12 | F. M. 2 | | 001 111 001 101 |
| | | C.S.A. SUM & ADD O.F. (Steps C&D) | 0 | 001 111 001 101 |
| | 13 | RIGHT CIR. SHIFT (Step E) | (X) | 100 111 100 110 |
| TRANSMIT SECOND FRAME (F.M. 1) | 12 | F. M. 1 | | 101 100 111 100 |
| | | C.S.A. SUM & ADD O.F. | 1 | 010 100 100 010 |
| | 13 | RIGHT CIR. SHIFT | | 101 010 (0)10 001 |
| | | O.F. PRODUCED COMPLEMENT MOCSA6 | (Y) | 101 010 (0)110 001 |
| | 14 | RIGHT CIR. SHIFT | (Z) | 110 101 011 000 |
| TRANSMIT FIRST DATA WORD ($W_0$) | 12 | DATA $WORD_0$ | | 100 000 000 000 |
| | | | 1 | 010 101 011 000 |
| | 13 | ADD O.F. & RIGHT CIRCULAR SHIFT | | 101 010 (1)01 100 |
| | | COMPLEMENT $MOCSA_6$ | | 101 010 (1)001 100 |
| | 14 | RIGHT CIRCULAR SHIFT | | 010 101 000 110 |

TABLE NO. 3

| No. of shift pulses | Data | MOCSA | MICSA Except* | No. of shift pulses |
|---|---|---|---|---|
| MOCSA cleared | | 000 000 000 000 | "F.M. 2 Stored in Buffer." | Preset F.M. 2 into MICSA. |
| 13 | F.M. 2 | 100 111 100 110 | *F.M. 1 Stored in Shift Register. | 13 MICSA. |
| 14 | F.M. 1 | 110 101 011 000 | 110 101 011 000 | 14. |
| 14 | $W_0$ | 010 101 000 110 | 010 101 000 110 | 14. |
| 13 | $W_1$ | 011 010 100 011 | 011 010 100 011 | 13. |
| 14 | $W_2$ | 111 101 010 001 | 111 101 010 001 | 14. |
| 13 | $W_3$ | 000 111 000 100 | 000 111 000 100 | 13. |
| 13 | $W_4$ | 010 011 100 010 | 010 011 100 010 | 13. |
| 13 | $W_5$ | 011 001 110 001 | 011 001 110 001 | 13. |
| 14 | $W_6$ | 111 100 111 000 | 111 100 111 001 | 14. |
| 13 | $W_7$ | 010 111 011 110 | 010 111 011 110 | 13. |
| 13 | $W_8$ | 011 011 101 111 | 011 011 101 111 | 13. |
| 14 | $W_9$ | 111 101 110 111 | 111 101 110 111 | 14. |
| 13 | F.M. 1 | 101 010 111 100 | 101 010 111 100 | 13. |
| 14 | F.M. 2 | 111 101 000 100 | 111 101 000 100 | 14. |
| 12 | Comp. MOCSA | 000 010 111 011 | 000 010 111 011 | 12. |
| O.S.R. 12 | | 000 010 111 011 | 111 111 111 111 | Received error free. |

Step A of Table 1 indicates that prior to transmission of a first frame of a data block, O.B.R. 107, O.S.R. 120, and M.O.C.S.A. 325 are all cleared. Step B indicates that buffer register O.B.R. 107 is loaded from data source 105. For example, the first frame of a data block loaded into O.B.R. 107 is frame mark No. 2 (F.M. 2). F.M. 2 may have the data bit sequence illustrated opposite F.M. 2 in Table 2.

Step C of Table 1 indicates that a 12-bit word (F.M. 2, for example) is transmitted. Concurrently with transmission of F.M. 2 the bit contents of the word are added on a bit-by-bit basis into the previously cleared stages of M.O.C.S.A. 325. This addition is accomplished, as shown in the drawing of FIG. 3, via the single bit binary adder 345. With reference to Table 2, the binary bits of F.M. 2 are shown added to the previously cleared contents of M.O.C.S.A. 325 in accordance with Step C of Table 1. The sum created when F.M. 2 is so added does not create any overflow ONES bit, as shown by the output state of overflow flip-flop of Table 2. Accordingly, at Step D, Table No. 1, the ZERO bit level established by overflow flip-flop 350, FIG. 3, remains as an input to binary adder 345. Step D places the ZERO overflow bit from overflow flip-flop 350 via binary adder 345, into the contents of M.O.C.S.A. 325. Step E is coincident with Step D and indicates that a right circular shift in the M.O.C.S.A. 325 takes place. Steps D and E require an additional or 13th shift pulse, as described earlier with respect to FIG. 5. By right circular shift it is meant that the right-hand bit of that instantaneous error-check content, as shown in Table 2, is transferred to the left-hand bit position and all other bits are right-shifted by one bit location.

Step F of Table 1 depends, at least in part, upon the particular bit sequence of the frame added in Step C. Step F may also depend, in part, upon the bit status of M.O.C.S.A. 325 when that particular frame is added. For example, if the 12-bit word added into M.O.C.S.A. in accordance with Step C was all ZEROS, then M.O.C.S.A.$_6$ is complemented and the M.O.C.S.A. contents are right-circular shifted in accordance with Step G of Table No. 1. The all ZERO condition is one of the two alternatives shown in Step F. These alternatives are mutually exclusive. Thus, if all ZEROS are added to M.O.C.S.A. 325 there can never be a ONES overflow from the last stage of M.O.C.S.A. If, however, the frame added during Step C was some data sequence other than all ZEROS, a ONES overflow may, or may not occur. Whether a ONES overflow occurs or not depends upon the data sequence added, and also depends upon the previous status of bit contents in M.O.C.S.A. 325. If an overflow ONES bit does occur, then the sixth bit position of the word contained in M.O.C.S.A. 325 is complemented. A 14th shift pulse is required to perform either alternative for this Step F.

The ONES overflow alternative of Step F occurs when frame mark F.M. 1 is transmitted during the second frame transmitting operation.

Reference is now made to the bracketed second frame transmit operation shown in Table No. 2. After transmission of the first frame, i.e., F.M. 2, the contents of M.O.C.S.A. 325 are as indicated at (X) in Table No. 2. The next addition of F.M. 1 in the manner previously described results in an overflow of a ONES bit. As mentioned hereinbefore, when an overflow occurs, according to Step G, Table No. 1, the sixth bit position of M.O.C.S.A. 325 is complemented. As illustrated at (Y) in the flow diagram of Table No. 2, the sixth bit is a ZERO and, when complemented thus becomes a ONE. After complementing the sixth bit position of M.O.C.S.A. 325, Step G, Table No. 1, further requires a right circular shift. This shift is depicted at (Z) in Table No. 2.

Returning to Step C, per Table No. 1, the next 12-bit word transmitted is monitored and is added into M.O.C.S.A. 325 in accordance with the steps just described. In the event that neither of the alternatives of Step F occur, then Step G is bypassed and the next frame is monitored and added to the contents of M.O.C.S.A. 325.

In Table No. 2, a typical first data word ($W_0$) is depicted. Note that only one ONE is present in data word $W_0$ but that word, when added to the contents of M.O.C.S.A. 325 after F.M. 1 was transmitted, results in an overflow ONES bit. The complement and right circular shift operation described above again takes place, After $W_0$ has been transmitted, the bit sequence for M.O.C.S.A. 325 is as shown in the last line of Table 2.

The order in which the frame marks are transmitted have an important significance in the receiver operation of this embodiment. When F.M. 2 is followed by F.M. 1, the receiver station 200, FIG. 1, is alerted to the fact that a data block follows F.M. 1. The frame marks, F.M. 2 and F.M. 1 are a known sequence of binary bits. That sequence is detected by a frame mark decoder 212 (FIG. 1). Circuit 210 at receiver station 200, FIG. 1, also contains a modified input check sum accumulator (hereinafter M.I.C.S.A.) which is structurally the same as M.O.C.S.A. 325 of FIG. 3. The operation of circuit 210, FIG. 1, including an M.I.C.S.A. register is the same as that described for M.O.C.S.A. of FIG. 3. Thus, a separate figure is not considered to be necessary since the circuit details for circuit 210 essentially repeat FIG. 3. The operation of circuit 210 may be fully understood by reference to FIG. 1.

One difference between the generation of an error-check word at transmit station 100 and the generation of an error-check word at receiver station 200 should be noted with respect to FIG. 1. It was mentioned hereinbefore that F.M. 2 and F.M. 1 must be present in buffer 207 and shift register 220 respectively, to indicate that a new data block is being received. F.M. 2 has thus passed the monitoring point, or input lead 446, for circuit 210 before receiver station 200 recognizes a new data block is being received. From the description hereinbefore it will be recalled that F.M. 2 at the transmitter station was added by adder 345 into M.O.C.S.A. 325. The column in Table No. 3 headed MOCSA shows F.M. 2 being added to the cleared contents of M.O.C.S.A. 325, FIG. 3. A similar adder is present in circuit 210, FIG. 1, but it cannot monitor and add the received F.M. 2 into a cleared M.I.C.S.A., since the received F.M. 2 passed the adder input lead 446 before recognition was made that a new block of data is being received. The sum received F.M. 2 plus F.M. 1 is, however, a known sequence of data bits. Accordingly, frame mark decoder 212 emits a preset command to the M.I.C.S.A. shift register through any well-known logic circuitry. This preset command places the data sequence 110 111 100 110 into the stages of register M.I.C.S.A. This sequence is the same sequence as that which previously existed in M.O.C.S.A. 325, FIG. 3, when F.M. 2 was added to the cleared register M.O.C.S.A. 325. At the time of this preset operation the received F.M. 1 is stored in shift register 220, FIG. 1, This condition is shown in the column headed MICSA in Table No. 3 where the asterisk indicates the discussed distinctions between the operation for generating an error-check word at the transmitter and an error-check word at the receiver. Following the preset, 13 shift pulses are employed to move F.M. 1 into buffer 107 as shown in retransmitting messages which have been incorrectly received is well known in the art and need not be described herein as it forms no part of the present invention.

While there has been shown unique and novel apparatus for performing the function of this method, illustrated with reference to Tables 1, 2 and 3, various other equipment may be used to perform the error-check method of this invention. Also, it should be understood that many alterations and modifications can be made to the embodiment shown here without departing from the spirit and scope of this invention.

We claim:

1. A method for detecting the presence of one or more errors in a received data block including a plurality of multibit binary words, which data block is transmitted from a first station and received at a second station, said method including the steps of:

monitoring said multibit words that are transmitted from a first station;

generating a first error-check word representing a modified binary summation of said monitored multibit words, that are transmitted, in accordance with preselected characteristics of each of said transmitted multibit words;

deriving a complement of said first error check word;

monitoring said multibit words that are received at a second station;

generating a second error check word representing a modified binary summation of said monitored multibit words, that are received, in accordance with said preselected characteristics of each of the received multibit words; and summing said second error-check word and said complement of said first error-check word to obtain a predetermined parity indicating word, the nonexistence of which signifies the presence of at least one error in said data block received at said second station.

2. The method defined by claim 1 wherein said multibit binary words each include a plurality of bits representing either binary ones or zeros and wherein said step of generating a first error-check word includes the steps of:

accumulating each successive multibit binary word that is transmitted to form successive check sum binary words; and modifying each said successive check sum binary word in response to the mutually exclusive presence of a carry bit produced by the step of accumulating or a transmitted multibit binary word entirely formed by bits representing binary zeros to form said first error-check word.

3. The method defined by claim 2 wherein the step of accumulating includes the steps of:

serially adding each transmitted multibit binary word to the existing check sum binary word to form a partially updated check sum binary word; and circular shifting the bits of said partially updated check sum binary word wherein the least significant bit is added to any carry bit resulting from the step of serially adding and inserted as the most significant bit of an updated check sum binary word.

4. The method defined by claim 2 wherein the step of modifying includes the steps of:

detecting the mutually exclusive presence of either a carry bit produced by the step of accumulating or a transmitted multibit word entirely formed by bits representing binary zeros;

complementing a selected bit included in said check sum binary word, in response to the detection of either said carry bit or said transmitted multibit binary word entirely formed by bits representing binary zeros; and circular shifting the bits of said check sum binary word in response to the step of complementing.

5. The method defined by claim 3 wherein the step of modifying includes the steps of:

detecting the mutually exclusive presence of either a carry bit produced by the step of serially adding or a transmitted multibit word entirely formed by bits representing binary zeros;

complementing a selected bit included in said updated check sum binary word in response to the detection of either said carry bit or said transmitted multibit word entirely formed by bits representing binary zeros; and circular shifting the bits of said check sum binary word in response to the step of complementing.

6. The method defined by claim 1 wherein said multibit binary words each include a plurality of bits representing either binary ones or zeros and wherein said step of generating a second error check word includes the steps of:

accumulating each successive multibit binary word that is received to form successive check sum binary words; and modifying each said successive check sum binary word in response to the mutually exclusive presence of a carry bit produced by the step of accumulating or a received multibit binary word entirely formed by bits representing binary zeros to form said second error-check word.

7. The method defined by claim 6 wherein the step of accumulating includes the steps of:

serially adding each received multibit binary word to the existing check sum binary word to form a partially updated check sum binary word; and circular shifting the bits of said partially updated check sum binary word wherein the least significant bit is added to any carry bit resulting from the step of serially adding and inserted as the most significant bit of an updated check sum binary word.

8. The method defined by claim 6 wherein the step of modifying includes the steps of:

detecting the mutually exclusive presence of either a carry bit produced by the step of accumulating or a received multibit word entirely formed by bits representing binary zeros;

complementing a selected bit included in said check sum binary word, in response to the detection of either said carry bit or said received multibit binary word entirely formed by bits representing binary zeros; and circular shifting the bits of said check sum binary word in response to the step of complementing.

9. The method defined by claim 7 wherein the step of modifying includes the steps of:

detecting the mutually exclusive presence of either a carry bit produced by the step of serially adding or a received multibit word entirely formed by bits representing binary zeros;

complementing a selected bit included in said updated check sum binary word in response to the detection of either said carry bit or said received multibit word entirely formed by bits representing binary zeros; and circular shifting the bits of said check sum binary word in response to the step of complementing.

10. Apparatus for providing an indication that a data block has been received at a receiving station free of errors after transmission from a transmitting station, said data block including a plurality of multibit binary words, said apparatus comprising:

first means for generating a first error check word representing a modified accumulation of transmitted multibit binary words, said accumulation being modified in response to and in accordance with preselected characteristics of each transmitted multibit binary word;

means responsive to said first error check word for generating the complement of said first error-check word;

second means for generating a second error-check word representing a modified accumulation of received multibit binary words, said accumulation being modified in response to and in accordance with said preselected characteristics of each received multibit binary word; and means responsive to said second error-check word and the complement of said first error-check word for providing an indication that said data block has been received free of errors.

11. The apparatus defined by claim 10 wherein said first means includes:

first monitoring means for monitoring transmitted multibit binary words;

first accumulator means for producing a modified accumulation of said transmitted multibit binary words;

first zero detector means, operatively coupled to said first accumulator means, for providing a bit complement signal in response to the presence of a transmitted multibit binary word entirely composed of bits representing binary zeros; and first overflow detector means, operatively coupled to said first accumulator means, for providing a bit complement signal in response to the presence of a carry bit resulting from said modified accumulation.

12. The apparatus defined by claim 11 wherein said first accumulator means includes:

a first binary adder, operatively coupled to said first monitoring means, for adding binary bits applied as inputs thereto; and a first multibit shift register, operatively coupled to receive a binary sum signal from said first binary adder, for storing a modified accumulation of said transmitted multibit binary words.

13. The apparatus defined by claim 12 wherein said first means further includes first shift means for producing a circular shift of the bits stored by said first multibit shift register in response to a bit complement signal from said first zero detector means or said first overflow detector means.

14. The apparatus defined by claim 10 wherein said second means includes:

second monitoring means for monitoring received multibit binary words;

second accumulator means for producing a modified accumulator of said received multibit binary words;

second zero detector means, operatively coupled to said second accumulator means, for providing a bit complement signal in response to the presence of a transmitted multibit binary word entirely composed of bits representing binary zeros; and second overflow detector means, operatively coupled to said first accumulator mans, for providing a bit complement signal in response to the presence of a carry bit resulting from said modified accumulation.

15. The apparatus defined by claim 14 wherein said second accumulator means includes:

a second binary adder, operatively coupled to said second monitoring means, for adding binary bits applied as inputs thereto;

a second multibit shift register, operatively coupled to receive a binary sum signal from said second binary adder, for storing a modified accumulation of said received multibit binary words; and means for presetting said second multibit shift register to store a multibit binary word identical to the first received multibit binary word.

16. The apparatus defined by claim 15 wherein said second means further includes: second shift means for producing a circular shift of the bits stored by said second multibit shift register in response to a bit complement signal from said second zero detector means or said second overflow detector means.

17. The apparatus defined by claim 16 wherein said first means includes:

first monitoring means for monitoring transmitted multibit binary words;

first accumulator means for producing a modified accumulation of said transmitted multibit binary words;

first zero detector means, operatively coupled to said first accumulator means, for providing a bit complement signal in response to the presence of a transmitted multibit binary word entirely composed of bits representing binary zeros; and first overflow detector means, operatively coupled to said first accumulator means, for providing a bit complement signal in response to the presence of a carry bit resulting from said modified accumulation.

18. The apparatus defined by claim 17 wherein said first accumulator means includes:

a first binary adder, operatively coupled to said first monitoring means, for adding binary bits applied as inputs thereto; and a first multibit shift register, operatively coupled to receive a binary sum signal from said first binary adder, for storing a modified accumulation of said transmitted multibit binary words.

19. The apparatus defined by claim 18 wherein said first means further includes first shift means for producing a circular shift of the bits stored by said first multibit shift register in response to a bit complement signal from said first zero detector means or said first overflow detector means.

20. Apparatus for detecting the presence of one or more errors in a received data block including a plurality of multibit binary words, which data block is transmitted from a first station and received at a second station; said apparatus comprising:

first monitoring means for monitoring multibit binary words transmitted from said first station;

first check sum accumulator means, operatively coupled to said first monitoring means, for generating a first error check word representing a modified accumulation of said multibit binary words transmitted from said first station, said accumulation being modified in response to each word transmitted and in accordance with preselected characteristics of each word transmitted;

means responsive to said first error-check word for generating the complement of said first error-check word;

second monitoring means for monitoring multibit binary words received at said second station;

second check sum accumulator means for generating a second error-check word representing a modified accumulation of said multibit binary words received at said second station, said accumulation being modified in response to each word received and in accordance with said preselected characteristics applied to each word received;

means for summing said second error-check word and the complement of said first error-check word to produce a parity indicating binary word which will have a predetermined sequence of binary bits whenever said data block is received error free.